US009577275B2

United States Patent
Eickhoff

(10) Patent No.: US 9,577,275 B2
(45) Date of Patent: Feb. 21, 2017

(54) POWER GENERATOR WITH HIGH PRESSURE HYDROGEN GENERATOR

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 215 days.

(21) Appl. No.: 14/590,746

(22) Filed: Jan. 6, 2015

(65) Prior Publication Data

US 2015/0303501 A1 Oct. 22, 2015

Related U.S. Application Data

(62) Division of application No. 11/726,490, filed on Mar. 22, 2007, now Pat. No. 8,962,198.

(51) Int. Cl.
| | | |
|---|---|---|
| *H01M 8/06* | (2016.01) | |
| *H01M 8/10* | (2016.01) | |
| *C01B 3/06* | (2006.01) | |
| *H01M 8/04* | (2016.01) | |
| *H01M 8/24* | (2016.01) | |
| *H01M 8/22* | (2006.01) | |

(52) U.S. Cl.
CPC .............. *H01M 8/0606* (2013.01); *C01B 3/06* (2013.01); *H01M 8/04089* (2013.01); *H01M 8/065* (2013.01); *H01M 8/1018* (2013.01); *H01M 8/2465* (2013.01); *H01M 8/225* (2013.01); *H01M 2008/1095* (2013.01); *H01M 2250/30* (2013.01); *Y02B 90/18* (2013.01); *Y02E 60/36* (2013.01); *Y02E 60/50* (2013.01)

(58) Field of Classification Search
None
See application file for complete search history.

(56) References Cited

U.S. PATENT DOCUMENTS

| | | |
|---|---|---|
| 4,155,712 A | 5/1979 | Taschek |
| 4,261,955 A | 4/1981 | Bailey, Jr. et al. |
| 5,372,617 A | 12/1994 | Kerrebrock et al. |
| (Continued) | | |

FOREIGN PATENT DOCUMENTS

| | | |
|---|---|---|
| WO | WO-03064319 A2 | 8/2003 |
| WO | WO-2005004273 A2 | 1/2005 |
| (Continued) | | |

OTHER PUBLICATIONS

"International Application Serial No. PCT/US2008/057434, International Preliminary Report on Patentability dated Sep. 22, 2009", 7 pgs.

(Continued)

*Primary Examiner* — Ula C Ruddock
*Assistant Examiner* — Amanda Barrow
(74) *Attorney, Agent, or Firm* — Schwegman Lundberg & Woessner, P.A.

(57) ABSTRACT

A power generator includes a hydrogen producing fuel in a first high pressure chamber. A fuel cell having a proton exchange membrane is disposed in a second low pressure chamber. A water absorbing material provides water vapor to the hydrogen producing fuel, and a plurality of valves control hydrogen provided to the fuel cell from the first high pressure chamber, and exposure of the water absorbing material to ambient and the high pressure chamber.

13 Claims, 2 Drawing Sheets

(56) References Cited

U.S. PATENT DOCUMENTS

| | | |
|---|---|---|
| 6,042,960 A | 3/2000 | DaCosta et al. |
| 6,093,501 A | 7/2000 | Werth |
| 6,303,009 B1 | 10/2001 | Bossard |
| 6,432,566 B1 | 8/2002 | Condit et al. |
| 8,962,198 B2 | 2/2015 | Elckhoff |
| 2001/0000380 A1 | 4/2001 | Buxbaum |
| 2003/0172589 A1 | 9/2003 | Krueger |
| 2003/0228252 A1 | 12/2003 | Shurtleff |
| 2004/0161646 A1 | 8/2004 | Rezachek et al. |

FOREIGN PATENT DOCUMENTS

| | | |
|---|---|---|
| WO | WO-2007008893 A2 | 1/2007 |
| WO | WO-2008/115954 A1 | 9/2008 |

OTHER PUBLICATIONS

"U.S. Appl. No. 11/726,490, Final Office Action mailed Jul. 14, 2014", 12 pgs.

"U.S. Appl. No. 11/726,490, Non Final Office Action mailed Feb. 13, 2014", 15 pgs.

"U.S. Appl. No. 11/726,490, Non Final Office Action mailed Mar. 31, 2011", 19 pgs.

"U.S. Appl. No. 11/726,490, Non-Final Office Action mailed Oct. 14, 2010", 15 pgs.

"U.S. Appl. No. 11/726,490, Notice of Allowance mailed Oct. 6, 2014", 11 pgs.

"U.S. Appl. No. 11/726,490, Response filed Jan. 14, 2011 to Non Final Office Action mailed Oct. 14, 2010", 11 pgs.

"U.S. Appl. No. 11/726,490, Response filed May 12, 2014 to Non Final Office Action mailed Feb. 13, 2014", 9 pgs.

"U.S. Appl. No. 11/726,490, Response filed May 31, 2011 to Final Office Action mailed Mar. 31, 2011", 9 pgs.

"U.S. Appl. No. 11/726,490, Response filed Sep. 7, 2010 to Restriction Requirement mailed Aug. 20, 2010", 6 pgs.

"U.S. Appl. No. 11/726,490, Response filed Sep. 15, 2014 to Final Office Action mailed Jul. 14, 2014", 9 pgs.

"U.S. Appl. No. 11/726,490, Restriction Requirement mailed Aug. 20, 2010", 7 pgs.

"International Application Serial No. PCT/US2008/057434, International Search Report and Written Opinion mailed Jul. 4, 2008".

Pasaogullari, Ugur, "Liquid Water Transport in Polymer Electrolyte Fuel Cells with Multi-Layer Diffusion Media", Proceedings of IMECE04, 2004 ASME International Mechanical Engineering Congress and Exposition, Anaheim, California, (Nov. 13-20, 2004), 1-9.

POWER GENERATOR WITH HIGH PRESSURE HYDROGEN GENERATOR

RELATED APPLICATIONS

This application is a divisional of U.S. patent application Ser. No. 11/726,490, filed Mar. 22, 2007, which is incorporated herein by reference.

BACKGROUND

In some fuel cell based power generators, hydrogen is extracted from a fuel in the presence of water and then is introduced into a fuel cell to produce electricity. Power generators based on hydrogen generators and proton exchange membrane (PEM) fuel cells may also have difficulty in providing increased power levels for sustained periods of time for selected portable devices. Fuel cell based power generators may provide higher energy density than conventional power sources like batteries, but may also have difficulty with high discharges, slow startup, and an inability to provide pulses of current. High costs of manufacture have also prevented wide commercialization. Many electronic devices have intermittent and widely varying power requirements from essentially zero to short pulses as high as a few Watts. These power requirements make it difficult to design a fuel cell for a wide variety of applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

An electrical power generator is provided which generates a high pressure hydrogen gas internally through the reaction of water vapor with a moisture absorbing, solid fuel substance. The hydrogen gas is provided to a low pressure chamber and reacted with oxygen at a fuel cell to generate electrical energy. A plurality of valves alternately expose a water absorbing material to a source of water, such as ambient atmosphere and to the fuel substance as a function of the hydrogen gas pressure to maintain a desired pressure of hydrogen gas. The electrical energy generated may be used to power large or small devices that are connected to the power generator, depending on the size of the power generator. The power generator of the invention is particularly useful for powering miniature devices such as wireless sensors, cellular phones or other hand held electronic devices that are electrically connected to the anode and cathode of the one or more fuel cells of the power generator.

Figure 1:
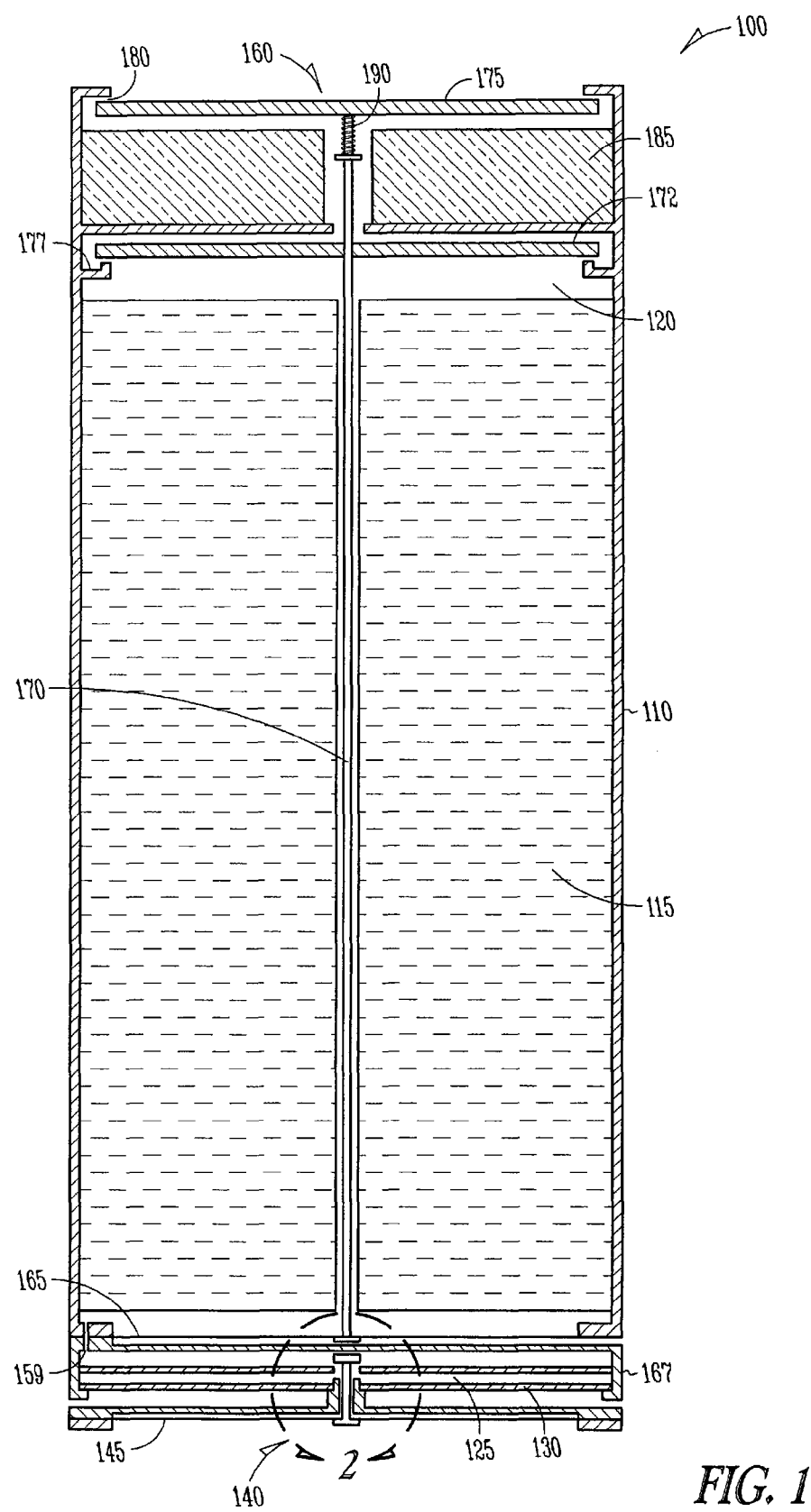
FIG. 1 is a cross-sectional schematic representation of a power generator having a high pressure hydrogen generator according to an example embodiment.
Figure 2:
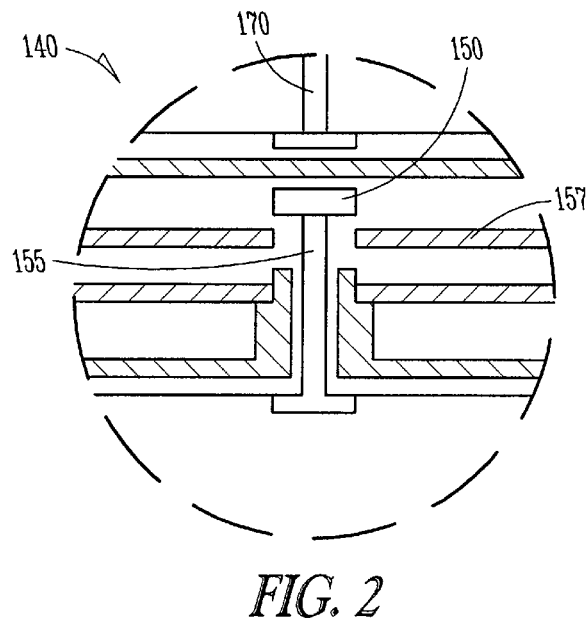
FIG. 2 is a cross-sectional schematic representation illustrating diaphragms for pressure control for the high pressure hydrogen generator of FIG. 1 according to an example embodiment.
Figure 3:
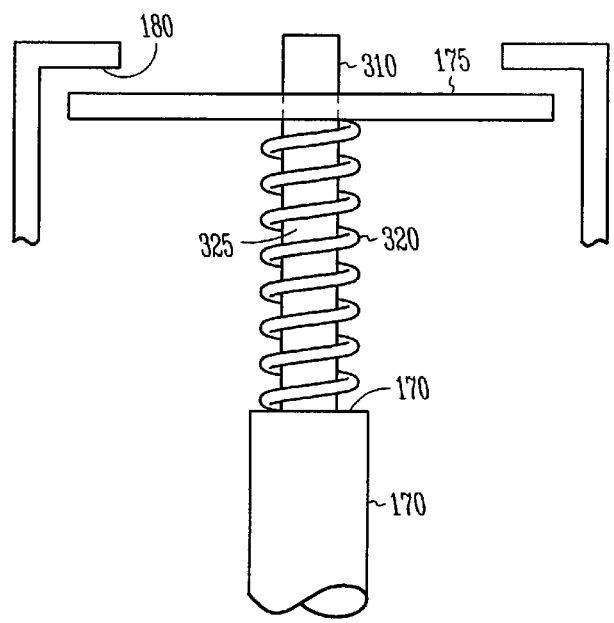
FIG. 3 is a cross-sectional schematic representation of an alternative arrangement for control for the high pressure hydrogen generator of FIG. 1 according to an example embodiment.

FIG. 1, along with enlarged views of FIG. 1 at FIGS. 2 and 3 illustrate a power generator 100 having a high pressure hydrogen generator. Power generator 100 includes a housing 110 that may be formed in the shape of an existing battery form factor, or otherwise as desired. A hydrogen producing fuel 115 is disposed within a high pressure chamber 120 of the housing 110. A low pressure chamber 125 is also formed within housing 110 in one embodiment. A fuel cell 130 is exposed to gas within the low pressure chamber 125, as well as to ambient. The housing 110 also contains a water absorbing material 135 that provides a source of water vapor for the hydrogen producing fuel 115 in the high pressure chamber 120.

A series of valves is used to control operation of the power generator 100. A first valve 140, shown in further detail in FIG. 2, comprises a pneumatically actuated flexible diaphragm 145 having a periphery that may be fixed to the power generator housing 110, a valve plate or disc 150 positioned opposite the diaphragm 145, and a rod connector 155 that joins the valve disc 150 and diaphragm 145. The first valve 140 is in a closed position when the valve disc 150 is in contact with a seal 157, preventing hydrogen from the high pressure chamber 120 from flowing to the low pressure chamber 125 and fuel cell 130. Hydrogen is allowed to flow through a passage 159 to valve disc 150. Valve disc 150 in contact with seal 157 is an off position, where little if any power is generated. Alternately, valve 140 is in an open position when the valve disc 150 is separated from seal 157, allowing hydrogen from the high pressure chamber 120 to reach the low pressure chamber 125 and fuel cell 130. Seal 157 may comprise a portion of housing 110.

The dimensions of the component parts of the first valve 140 may be very small in scale but may vary with respect to the particular application of the valve. The diaphragm thickness and diameter should be within a certain range depending on the difference in pressure between the high pressure chamber 120 and the low pressure chamber 125. In one embodiment of the invention, the diaphragm 145 comprises a thin circular plate having a diameter of from about 1 cm to about 3 cm, or from about 1 cm to about 2 cm. The valve disc 150 may have a diameter of from about 0.2 to about 1 cm, or may be from about 0.2 cm to about 0.5 cm. Such dimensions may vary greatly in further embodiments, such as a function of overall size of the power generator 100. In one embodiment of the invention, the rod connector 155 may comprise a screw or a bolt, but any other means of connecting the diaphragm 145 to the valve disc 150 is suitable such that the valve can alternate between the open and closed positions.

The actuation of the first valve 140 may be controlled by the internal gas pressure exerted on the diaphragm 130. As the gas pressure in the low pressure chamber 125 increases due to flow of hydrogen gas from the high pressure chamber 120, the diaphragm 145 will bend or push outward slightly. This causes the rod connector 155 to pull the valve disc 150 against the seal 157, closing the valve and preventing the flow of additional hydrogen to the fuel cell 130. With the first valve closed, generation of power ceases. As hydrogen is consumed, such as by fuel cell 130 in response to a load on generator electrodes which are not shown, the internal gas pressure drops in the low pressure chamber 125, allowing the valve disc 150 to disengage the seal 157 and opening the valve 140.

A second valve 160 includes a diaphragm 165 disposed in the housing 110 between the high pressure chamber 120 and ambient as indicated at 167. A connecting valve pin or rod 170 couples the diaphragm 165 to two plates 172, 175 with corresponding seals 177, 180 on either side of a water absorbing material 185. The second valve 160 operates to selectively expose the water absorbing material to ambient conditions or to the high pressure chamber 120 and fuel 115. When hydrogen pressure is sufficient, such as approximately 100 PSI in one embodiment, valve plate 172 is sealed against seal 177, and the fuel 115 and high pressure chamber 120 are not exposed to the water absorbing material 185. In this position, valve plate 175 is not sealed against seal 180, and the water absorbing material is exposed to ambient, and stores water scavenged from water vapor in the air.

If the pressure in the high pressure chamber 120 drops to a low pressure threshold, such as 20 PSI, diaphragm 165 bulges outward, causing valve plate 175 to seal against seal 180, isolating the water absorbing material 185 from ambient. Valve plate 172 opens from seal 177, allowing water to be provided from the water absorbing material 185 to the fuel 115, creating hydrogen, and raising the pressure within the high pressure chamber 120.

In one embodiment, the operation of valve plate 172 is substantially linear in a range of pressures in the high pressure chamber 120, being fully open at approximately 20 PSI, and fully closed at approximately 100 PSI. While open, the pressure is increasing in the high pressure chamber due to creation of hydrogen from the fuel 115. Once the desired high pressure is reached, 100 PSI in one example embodiment, the valve plate 172 is fully closed, and at that point, valve plate 175 opens, allowing absorption of water by the water absorbing material from ambient air humidity.

To accomplish such a delayed opening, valve plate 175 may be coupled to the pin via a spring and piston arrangement 190, secured to the pin on a first end, and pressing against valve plate 175 at a second end. The spring and piston arrangement 190 may utilize a cylinder or rod, either external to the pin 170, or inside of it to provide motion of the valve plate 175 with respect to the pin 170, allowing the plate to seal the water absorbing material from ambient until valve plate 172 closes to prevent escape of hydrogen to ambient. Spring and piston arrangement 190 also serves to isolate the high pressure chamber from ambient when the pressure drops and valve plate 172 starts to open to cause hydrogen generation. This operation of valve 160 may prevent significant hydrogen permeation loss to ambient through the water absorbing material, while allowing the power generator 100 to extract water from ambient.

The water absorbing material 185 may comprise a perfluorosulfonate ionomer membrane commercially available under the trademark Nafion® from EI DuPont de Nemours & Co. of Delaware. Nafion® may be used in one embodiment because it has a fluorinated backbone that makes it very stable, with sulfonic acid side chains that absorb water. Water absorbing material 185 absorbs water from ambient and allows it to diffuse to the high pressure chamber 120 when valve plate 172 is open due to low pressure conditions in the high pressure chamber 120.

In further embodiments, the water absorbing material 185 may be constructed of any material or materials that are substantially impermeable to hydrogen and highly permeable to $H_2O$. It may be desirable for the water absorbing material 185 to have a high $H_2O$ unit volume.

FIG. 3 is an alternative spring arrangement for control of valve plate 175. In this alternative embodiment, pin 170 narrows to form a narrow pin section 310 that has a shoulder section 315 with a first end of a spring 320 supported on the shoulder section 315. The narrow pin section 310 extends through a hole in plate 175 in a sealed manner, and allows movement of the narrow pin section through the hole 325. A second end of spring 320 abuts the plate 175 and is coupled to it in one embodiment to ensure plate 175 disengages from seal 180 when desired. Spring 320 keeps plate 175 sealed until plate 172 is sealed, preventing flow of hydrogen out of the high pressure chamber 120 to ambient. Many other arrangements may be used to control valve plate 175 in further embodiments.

The first valve regulates the generation of power by the fuel cell 130, while the second valve 160 regulates the production of hydrogen. In combination, a reserve of hydrogen is provided to enable the power generator 100 to provide longer periods of higher power generation. The water absorption material 185 provides a far denser source of water than ambient water vapor, and is sized to at least enable the pressure in the high pressure chamber 120 to return to desired levels, such as 100 PSI in one embodiment. In normal operating conditions, such as providing zero to low currents, regulation by first valve 140 is sufficient. For higher currents, such as above 50 $mA/cm^2$, the pressurized hydrogen is utilized to generate power in an extended transient mode, that might last as long as a few hours depending on the power level and power generator configuration.

Based on rough calculations for a power generator 100 form factor consistent with a AA battery, 100 ATM will allow the generator 100 to operate at 300 mW for approximately 4 hours, which should be sufficient for most applications. The design will allow the power generator to product large amounts of power for extended periods of time with a low self discharge rate. Additionally, since the power generator 100 is not operating in the low membrane hydration condition typical of "water-less" mode, and since it does not directly reclaim its water from the fuel cell, its power output will be significantly less sensitive to ambient temperature and humidity.

In one embodiment, generator 100 includes a cathode output electrode and an anode output electrode. In one embodiment, the generator may be shaped similar to a commercially available dry cell battery, such that it can be substituted for the dry cell battery. Many other shapes, sizes and capacities of power generators may be formed in further embodiments, from small for electronics to very large, such as for automobiles.

Fuel cell 130 in one embodiment may include a proton exchange membrane (PEM) or other type of membrane that combines hydrogen and oxygen to produce water and electricity such as GDLs or MPLs. The anode electrode may be coupled to the fuel cell 130. A cathode electrode may be coupled to the other side of the fuel cell.

A typical PEM fuel cell comprises an electrolytic membrane positioned between a positive electrode, or cathode, on one side of the membrane, and a negative electrode, or anode, on the other side of the membrane. In typical hydrogen-oxygen PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons must instead travel along an external circuit to the cathode, creating an electrical current. At the cathode, the electrons and positively charged hydrogen ions combine with oxygen to form water molecules.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of operating a power generator, the method comprising:
    absorbing water into a water absorbing material from ambient;
    controlling, using a plurality of valves, exposure of the water absorbing material to the ambient;
    controlling, using the plurality of valves, exposure of the water absorbing material to a first chamber to provide water vapor to the first chamber, wherein a first chamber pressure in the first chamber is higher than an ambient pressure;
    producing hydrogen in the first chamber, the first chamber including a hydrogen producing fuel;
    controlling, using the plurality of valves, hydrogen provided from the first chamber to a second chamber;
    producing electricity from hydrogen and oxygen in the second chamber, wherein a second chamber pressure in the second chamber is lower than the first chamber pressure; and
    sealing off, using a spring and piston arrangement coupled to the plurality of valves, the water absorbing material from the ambient until a valve plate between the water absorbing material and hydrogen producing fuel is closed.

2. The method of claim 1, wherein controlling exposure of the water absorbing material to the first chamber includes exposing the water absorbing material to the first chamber when first chamber pressure is below a first chamber threshold pressure.

3. The method of claim 1, wherein controlling exposure of the water absorbing material to the first chamber includes isolating the water absorbing material from the first chamber when first chamber pressure is above the first chamber threshold pressure.

4. The method of claim 1, wherein controlling exposure of the water absorbing material to the ambient includes exposing the water absorbing material to the ambient when the first chamber pressure is above the first chamber threshold pressure.

5. The method of claim 1, wherein producing electricity in the second chamber includes producing electricity by exposing hydrogen to a hydrogen fuel cell, the hydrogen fuel cell including a PEM membrane.

6. The method of claim 1, wherein:
    the plurality of valves includes a first valve that includes a membrane positioned between the ambient and the second chamber; and
    controlling hydrogen provided from the first chamber to the second chamber includes controlling the first valve.

7. The method of claim 1, wherein the plurality of valves includes a pair of plates and corresponding seals disposed on either side of the water absorbing material.

8. The method of claim 7, wherein controlling exposure of the water absorbing material to the first chamber includes exposing, using the pair of plates and corresponding seals, the first chamber to the water absorbing material as a function of the first chamber pressure.

9. The method of claim 7, wherein exposing the first chamber to the water absorbing material includes:
    exposing, using the pair of plates and corresponding seals, the first chamber to the water absorbing material when the first chamber pressure is below the first chamber threshold pressure; and
    isolating, using the pair of plates and corresponding seals, the first chamber from the water absorbing material when the first chamber pressure is above the first chamber threshold pressure.

10. The method of claim 9, wherein controlling exposure of the water absorbing material to the ambient includes exposing, using the pair of plates and corresponding seals, the water absorbing material to the ambient when the first chamber is isolated from the water absorbing material.

11. The method of claim 9, wherein controlling exposure of the water absorbing material to the first chamber includes controlling the pair of plates using at least one pin coupled to a diaphragm positioned between the first chamber and the ambient.

12. The method of claim 11, wherein:
    the at least one pin is coupled to the spring and piston;
    one of the plates and corresponding seal is positioned between the water absorbing material and the ambient; and
    wherein controlling exposure of the water absorbing material to the first chamber includes moving the one of the plates and corresponding seal relative to the at least one pin responsive to the spring and piston.

13. The method of claim 1, wherein absorbing water into a water absorbing material from ambient includes absorbing water into a perfluorosulfonate ionomer.

* * * * *